G. B. DE LIMA.
STEEPING COFFEE OR TEA.
APPLICATION FILED SEPT. 9, 1911.
1,041,822.                               Patented Oct. 22, 1912.
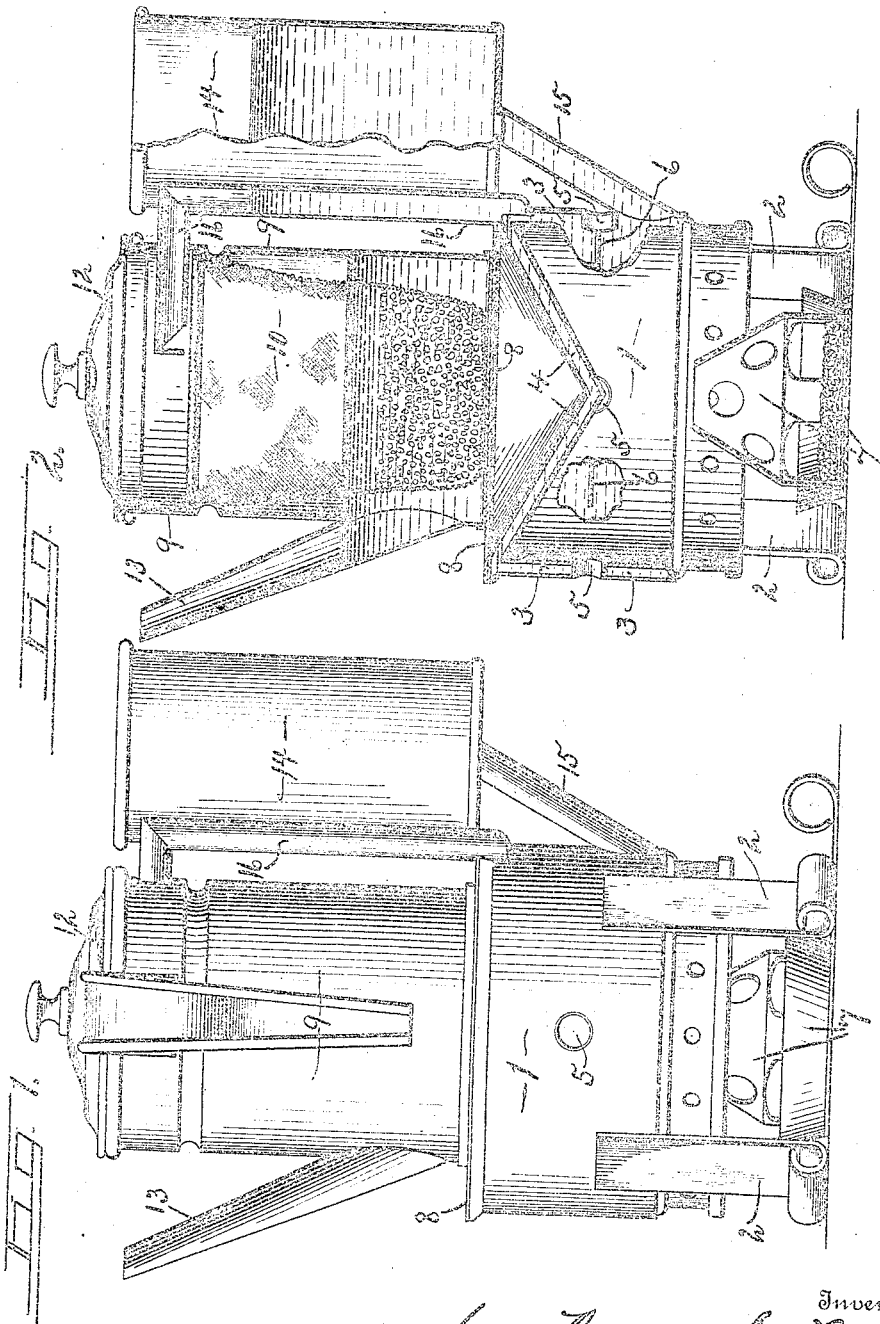

UNITED STATES PATENT OFFICE.

GAY BARBER DE LIMA, OF SYRACUSE, NEW YORK.

STEEPING COFFEE OR TEA.

1,041,822.

Specification of Letters Patent.   Patented Oct. 22, 1912.

Application filed September 9, 1911. Serial No. 648,586.

*To all whom it may concern:*

Be it known that I, GAY BARBER DE LIMA, of Syracuse, in the county of Onondaga, in the State of New York, have invented new and useful Improvements in Steeping Coffee or Tea, of which the following, taken in connection with the accompanying drawings, is a full, clear, and exact description.

This invention relates to devices for steeping coffee or tea, and has particular reference to that class which are adapted to be placed upon the table and the beverage made in a minimum space of time when needed.

The invention herein described and claimed is particularly directed to the hot water heating drum or boiler, by which I am able to boil the water so as to force it up into the coffee pot itself and allow it to percolate through the coffee in the least amount of time, thereby enabling the user to obtain quick returns from the device manufactured in accordance with this invention.

To that end therefore my invention consists of several new and novel features of construction and operation hereinafter described and which I specifically set forth in the claim hereunto annexed.

It is constructed as follows, reference being had to the accompanying drawings in which, Figure 1 shows a side view of the device complete. Fig. 2 is a similar view except that certain parts are broken away so as to show the interior construction and operating parts.

Similar letters of reference indicate corresponding parts in all the views.

—1— is the boiler constructed preferably cylindrical in form and mounted upon suitable legs or uprights —2—. The boiler consists of the water jacket —3— extending around the walls and continues in a concave direction at the top as shown at —4—.

The boiler has heat ventilating openings —5— at suitable intervals.

—6— is a partition extending laterally from the point adjacent the cold water intake around toward the opposite side for purposes which will be hereinafter explained.

—7— is any suitable portable lamp preferably an alcohol lamp such as is usually used. Upon the top of the boiler is a false top —8— and —9— is the coffee pot resting on said false top —8—, and within the coffee pot is a sack —10—, containing coffee —11—, the coffee pot having the usual cover —12— and spout —13—.

Upon one side of the boiler and just above it is mounted a cold water tank having a conduit —15—, allowing the water to pass out of the tank —14— into the bottom of the water jacket —3—.

Extending from the upper part of the water jacket and adjacent to the tank is a pipe —16— leading into the steeping pot and so arranged that when the water passes from the water jacket —3— that it will drop upon the coffee and percolate through it in the usual way.

In the operation of this invention it will be noted that in order to make a beverage, as for illustration, coffee, the tank —14— is first filled to the extent of about two-thirds of its capacity with water. This passes down through the outlet pipe —15— into the water jacket —3— and its continuation —4— and continues up through the pipe —16— so that it maintains the same level in the pipe —16— as is contained in the tank —14—. The lamp is then lighted and the heat being confined within the cylindrical boiler radiates against not only the inner face of the cylindrical water jacket —3— but also against the inner face of the concave water jacket —4— forming the top of the boiler thereby radiating against an extremely large surface which causes almost instantaneous heating and boiling of the water sufficiently to cause it to pass up through the pipe —16— and over into the sack containing the coffee in the coffee pot in the usual way.

In order that there may be no dead water contained in the boiler, I employ a partition —6— extending as above described partially around within the water jacket —3— so that when the water is heated, it will of necessity be forced to the opposite side of the water jacket before it can pass around to the top of the water jacket —3— and out through the pipe —16—, thus at all times insuring perfect circulation, and avoiding a congestion of dead water at the portions opposite the intake and outlet pipes, and at all times insure a constant flow of the heated water through the pipe —16—.

What I claim is:

In an apparatus of the class described, a water jacket constituting a boiler and having a hollow inverted conical top in communication with the water jacket, a lateral partition in the water jacket extending partially around the same, a tank supported at one side and above the boiler, a conduit connecting the lower end of said tank with the jacket below said partition, and a vertically-extending outlet pipe leading from the jacket above said partition to a point near the upper end of the tank.

In witness whereof I have hereunto set my hand this 6th day of September, 1911.

GAY BARBER DE LIMA.

Witnesses:
  H. P. DENISON,
  E. F. SPEARING.